Dec. 19, 1967   W. R. MACMILLAN   3,358,914
COMPRESSORS
Filed Oct. 6, 1965   2 Sheets-Sheet 1

United States Patent Office 3,358,914
Patented Dec. 19, 1967

3,358,914
COMPRESSORS
William Robertson Macmillan, Sale, England, assignor to Tilghman's Limited, Broadheath, Altrincham, England, a British company
Filed Oct. 6, 1965, Ser. No. 493,403
Claims priority, application Great Britain, Oct. 6, 1964, 40,668/64
4 Claims. (Cl. 230—172)

ABSTRACT OF THE DISCLOSURE

An oil-free piston compressor having an antifriction lining on the contact surfaces between the piston and the cylinder and having a chankshaft constructed so as to be able to be dismantled into a plurality of parts, all the bearings in the compressor being of the lubricated sealed type so that the compressor is able to operate without lubricating oil.

---

In previously proposed air compressors the moving parts thereof have been lubricated by oil and a serious problem has arisen in cases e.g. when particularly hygienic conditions are required, where oil free air is required. If suitable precautions are not taken, the oil lubricant tends to contaminate the air produced by the compressor so that devices such as filters or separators have to be introduced to separate the oil from the air.

An object of the present invention is to provide a compressor whereby such oil contamination is eliminated.

According to the present invention there is provided an oil-free gas compressor comprising a piston and cylinder, piston rings of antifriction material, a segmented circumferential layer of anti-friction material surrounding the skirt of the piston and detachably secured thereto, a bearing of the lubricated, sealed type connected with said piston, a connecting rod carrying said piston through the intermediary of said bearing, a crankshaft carrying said connecting rod, said crankshaft being formed in a plurality of parts, and a plurality of bearings of the lubricated, sealed type for the crankshaft parts, one of said bearings for the crankshaft parts supporting the connecting rod on one of the crankshaft parts.

Figure 1:
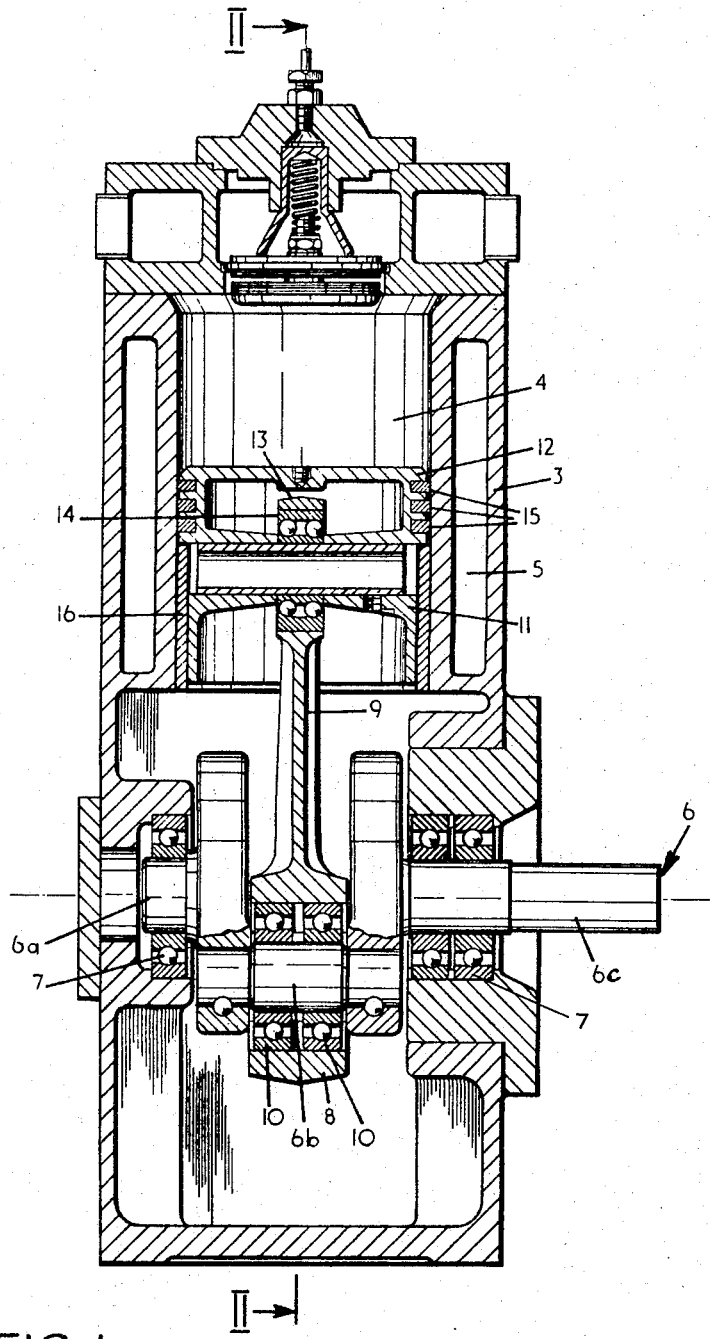
Figure 2:
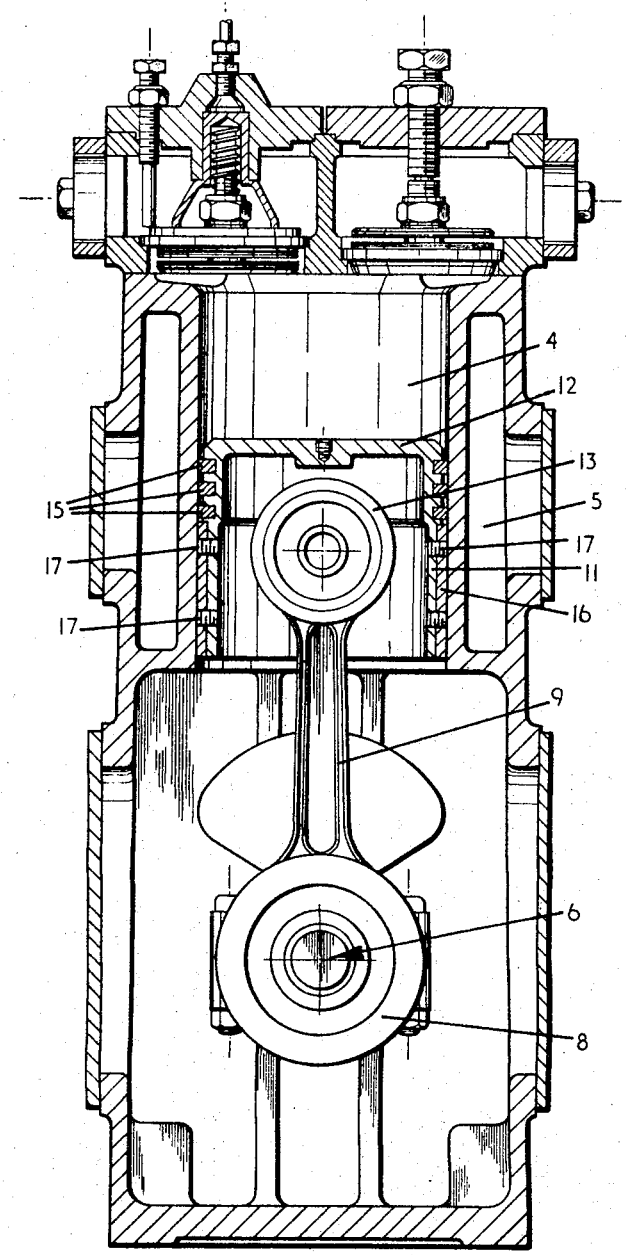

An embodiment of the invention will now be described, by way of example, with reference to the accompanying drawings in which:

FIG. 1 is a vertical sectional view of a compressor in accordance with the invention, and FIG. 2 is a sectional view on the line 11—11 of FIG. 1.

Referring to the drawings, an air compressor comprises an exterior housing 3 whose upper part has a cylinder 4 formed therein, and the cylinder 4 is surrounded by a hollow jacket 5 whereby water cooling of the cylinder can be effected. The lower part of the housing 3 forms a crank case in which is mounted a horizontal crank shaft 6 which is spilt into three parts 6a, 6b and 6c with parts 6a and 6c being journalled in permanently lubricated sealed bearings and 6b in bearings 10. These bearings 7 and 10 are of a known type in which lubricating grease is introduced into the bearing during manufacture, with the grease then being sealed in so that no further lubrication of the bearing is required.

Splitting of the crank shaft 6 is necessary to allow big end 8 of a connecting rod 9 to be mounted on the central crank part 6b, and the end 8 is split and journalled on the two sealed bearings 10 carried by the central crank part 6b. The connecting rod 9 extends upwardly to skirt 11 of a piston 12 where its solid small end 13 is journalled on a single sealed, self-aligning bearing 14 of a known type, the piston 12 is slidable within the cylinder 4 in the upper part of the compressor housing.

The piston 12 is provided with three conventional piston rings 15 of polytetrafluoroethylene while that circumferential surface of the skirt below the piston rings 15, and which would otherwise be liable to come into contact with the cylinder walls during operation of the compressor and consequently require lubrication, is provided with a lining or slippers 16 of polytetrafluoroethylene. The skirt diameter is suitably reduced to receive the lining 16. The lining 16 is made of a sleeve of polytetrafluoroethylene which is finish machined to the required cylinder bore and piston outside diameter. The sleeve is then cut into four segments, two of which are pinned by nylon screws 17 (FIG. 2) to the skirt surface, and due to this there is a tendency for the individual segments of the lining to open out, but during fitting the piston 12 and skirt 11 together with linings 16 and piston rings 15 fitted are merely squeezed into the cylinder bore whereupon it takes up the shape of the bore.

Due to the fact that the skirt 11 and piston 12 are completely watercooled during operation of the compressor, via the cylinder wall the piston rings 15 and crosshead lining 16 will be effective for long trouble-free periods. When it is necessary to replace the piston rings 15 or lining 16, the piston 12 and crosshead 11 are merely removed and new rings or lining fitted.

It will be readily apparent that the above described arrangement provides a dry sump air compressor in which oil contamination of the air is eliminated. This is due to the fact that oil as a lubricant is dispensed with in favor of permanently-lubricated, sealed bearings where bearings are required and the provision of a lining of polytetrafluoroethlyene on the contacting surfaces of the cylinder bore and the piston element formed by the integral piston and skirt The term "piston element" as used above and in the claims is intended to cover the piston proper together with any associated components which it may have e.g. the skirt, which components have a contacting surface with the cylinder walls.

It is also within the scope of the present invention that a cylindrical lining of polytetrafluoroethylene be provided on the cylinder bore, a piston of conventional construction then being able to be employed.

Although pure polytetrafluoroethylene has been found to be the most satisfactory anti-friction material for use in the invention, other materials with similar anti-friction properties can be employed e.g. a mixture of polytetrafluoroethylene and carbon.

What I claim is:

1. An oil-free gas compressor comprising a piston and cylinder, piston rings of anti-friction material, a segmented circumferential layer of anti-friction material surrounding the skirt of the piston and detachably secured thereto, a bearing of the lubricated, sealed type connected with said piston, a connecting rod carrying said piston through the intermediary of said bearing, a crankshaft carrying said connecting rod, said crankshaft being formed in a plurality of parts, and a plurality of bearings of the lubricated, sealed type for the crankshaft parts, one of said bearings for the crankshaft parts supporting the connecting rod on one of the crankshaft parts.

2. An oil-free compressor as claimed in claim 1, wherein screws are provided for detachably securing the segments of anti-friction material to the skirt of the piston.

3. An oil-free compressor as claimed in claim 1, wherein the screws are made of nylon.

4. An oil-free compressor as claimed in claim 1, wherein the crankshaft is formed in three parts, the crankshaft part carrying the connecting rod being detachably secured to the other two crankshaft parts.

References Cited

UNITED STATES PATENTS

| | | | |
|---|---|---|---|
| 1,363,788 | 12/1920 | Hilton | 230—172 X |
| 1,549,064 | 8/1925 | Cooke | 230—172 X |
| 2,817,562 | 12/1957 | Fleming et al. | 92—155 |
| 2,856,246 | 10/1958 | Gaubatz | 308—187.2 |
| 2,888,879 | 6/1959 | Gaarder | 92—155 X |
| 3,039,834 | 6/1962 | Howe | 92—155 X |

ROBERT M. WALKER, *Primary Examiner.*